(12) United States Patent
Villar et al.

(10) Patent No.: US 9,383,973 B2
(45) Date of Patent: Jul. 5, 2016

(54) CODE SUGGESTIONS

(75) Inventors: Nicolas Villar, Cambridge (GB); James Scott, Cambridge (GB); Stephen Hodges, Cambridge (GB); Albrecht Schmidt, Satteldorf (DE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 528 days.

(21) Appl. No.: 13/171,846

(22) Filed: Jun. 29, 2011

(65) Prior Publication Data

US 2013/0007700 A1    Jan. 3, 2013

(51) Int. Cl.
*G06F 9/44* (2006.01)
(52) U.S. Cl.
CPC ........................................ *G06F 8/33* (2013.01)
(58) Field of Classification Search
None
See application file for complete search history.

(56) References Cited

U.S. PATENT DOCUMENTS

| | | | |
|---|---|---|---|
| 6,305,008 B1 * | 10/2001 | Vaidyanathan et al. | 717/111 |
| 7,191,429 B2 * | 3/2007 | Brassard et al. | 717/113 |
| 7,631,294 B2 * | 12/2009 | Rush et al. | |
| 7,665,061 B2 * | 2/2010 | Kothari et al. | 717/106 |
| 7,694,278 B2 * | 4/2010 | Pasumansky et al. | 717/111 |
| 7,797,673 B2 * | 9/2010 | Szpak | 717/109 |
| 7,860,741 B1 * | 12/2010 | Robinson | 705/7.31 |
| 7,937,688 B2 * | 5/2011 | Vaidyanathan et al. | 717/111 |
| 8,126,879 B2 * | 2/2012 | Gemmell et al. | 707/723 |
| 8,214,264 B2 * | 7/2012 | Kasavin et al. | 705/26.7 |
| 8,266,594 B2 * | 9/2012 | Balasubramanian | 717/125 |
| 8,285,702 B2 * | 10/2012 | Carmel et al. | 707/709 |
| 8,307,333 B2 * | 11/2012 | Peterson | G06F 8/33 717/110 |
| 8,307,334 B2 * | 11/2012 | Peterson | G06F 8/33 717/110 |
| 8,307,335 B2 * | 11/2012 | Hutchison et al. | 717/110 |
| 8,321,836 B2 * | 11/2012 | Meijer et al. | 717/113 |
| 8,413,111 B2 * | 4/2013 | Paster | 717/111 |
| 8,510,709 B2 * | 8/2013 | Bordelon et al. | 717/109 |
| 8,566,787 B2 * | 10/2013 | Maskeri Rama | G06F 8/72 717/109 |
| 8,726,231 B2 * | 5/2014 | Sirr et al. | 717/111 |
| 8,756,576 B2 * | 6/2014 | Balasubramanian | G06F 8/33 717/110 |
| 8,843,890 B2 * | 9/2014 | Frenkiel | G06F 8/51 717/110 |
| 8,869,097 B2 * | 10/2014 | Asadullah | G06F 8/33 717/110 |

(Continued)

OTHER PUBLICATIONS

Su, Khoshgoftaar, "A Survey of Collaborative Filtering Techniques", 2009, Advances in AI; [retrieved on Nov. 12, 2013]; Retrieved from Internet <URL:http://dl.acm.org/citation.cfm?id=1722966>;pp. 1-19.*

(Continued)

*Primary Examiner* — Xi D Chen
(74) *Attorney, Agent, or Firm* — Andrew Smith; Sonia Cooper; Micky Minhas

(57) ABSTRACT

Code suggestion technique embodiments are presented that improve the productivity of a programmer by assisting in both the writing of code and in debugging the code as it is being written. In general, this is accomplished by automating a search of a database of the past work and problem solving activities of programmers to make suggestion to a programmer currently writing code. For example, as a programmer enters code, suggested ways of finishing a line or code section are presented based on how previous programmers finished a similar line or code section. Another example involves a programmer who encounters an error message while writing code. In such a case, the programmer is provided with a suggested fix or fixes, based on the actions taken by previous developers when encountering a similar problem.

14 Claims, 4 Drawing Sheets

(56) References Cited

U.S. PATENT DOCUMENTS

| | | | | |
|---|---|---|---|---|
| 8,924,928 | B1* | 12/2014 | Belovich | |
| 9,009,661 | B2* | 4/2015 | Nelson | 717/111 |
| 2003/0212669 | A1* | 11/2003 | Dedhia et al. | 707/3 |
| 2004/0003335 | A1* | 1/2004 | Gertz et al. | 714/758 |
| 2004/0034846 | A1* | 2/2004 | Ortal | G06F 8/24 717/111 |
| 2005/0125773 | A1* | 6/2005 | Hawley et al. | 717/109 |
| 2006/0005169 | A1* | 1/2006 | Berstis et al. | 717/125 |
| 2006/0277525 | A1 | 12/2006 | Najmabadi et al. | |
| 2007/0074162 | A1 | 3/2007 | Meijer et al. | |
| 2007/0157165 | A1* | 7/2007 | Kim | G06F 8/36 717/109 |
| 2007/0255707 | A1* | 11/2007 | Tresser et al. | 707/6 |
| 2008/0127037 | A1 | 5/2008 | Kadur et al. | |
| 2009/0077534 | A1* | 3/2009 | Peterson | G06F 8/33 717/111 |
| 2009/0158307 | A1* | 6/2009 | Kashitani | 725/9 |
| 2009/0254880 | A1* | 10/2009 | Gryko et al. | 717/109 |
| 2009/0287687 | A1* | 11/2009 | Martire et al. | 707/5 |
| 2010/0050151 | A1 | 2/2010 | Balasubramanian | |
| 2010/0050154 | A1* | 2/2010 | Balasubramanian | 717/113 |
| 2010/0306736 | A1* | 12/2010 | Bordelon et al. | 717/109 |
| 2011/0016347 | A1 | 1/2011 | Brodeur et al. | |
| 2011/0035272 | A1* | 2/2011 | Bhatt et al. | 705/14.42 |
| 2012/0167042 | A1* | 6/2012 | Tillmann et al. | 717/113 |
| 2012/0240101 | A1* | 9/2012 | Balasubramanian | 717/110 |
| 2013/0263086 | A1* | 10/2013 | Carter et al. | 717/113 |
| 2013/0268912 | A1* | 10/2013 | Kizhakkevalappil | G06F 8/34 717/109 |
| 2014/0165028 | A1* | 6/2014 | Balasubramanian | 717/109 |
| 2015/0067640 | A1* | 3/2015 | Booker | G06F 8/33 717/109 |
| 2015/0082274 | A1* | 3/2015 | Resig | G06F 8/71 717/109 |

OTHER PUBLICATIONS

Jiang, et al., "Learning User Reformulation Behavior for Query Auto-Completion"; 2014 ACM; [retrieved on Nov. 3, 2014>; Retrieved from Internet <URL: http://dl.acm.org/citation.cfm?id=2600428>;pp. 445-454.*

Johnson, et al., "Wy Don't Software Developers Use Static Analysis Tools to Find Bugs?"; 2013 ACM; [retrieved on Nov. 3, 2014>; Retrieved from Internet <URL: http://dl.acm.org/citation.cfm?id=2486788>;pp. 672-681.*

Kadar, Sulaiman, "The Effectiveness of Zoom Visual Flow (ZViF) Technique in Program Comprehension Activities"; 2010 IEEE; [retrieved on Nov. 3, 2014>; Retrieved from Internet <URL: http://ieeexplore.ieee.org/stamp/stamp.jsp?tp=&arnumber=5561292>;pp. 1-6.*

Smolenski, "An ATLAS Integrated Development Environment"; 1995 IEEE; [retrieved on Nov. 3, 2014>; Retrieved from Internet <URL: http://ieeexplore.ieee.org/stamp/stamp.jsp?tp=&arnumber=522659>;pp. 94-100.*

Sahavechaphan, Claypool, "XSnippet Mining for Sample Code"; 2006 ACM; [retrieved on Jan. 25, 2016]; Retrieved from Internet <URL:http://dl.acm.org/citation.cfm?id=1167508 &Cfid=746332881>;pp. 413-430.*

Franks, et al., "Cacheca:: A Cache Language Model Based Code Suggestion Tool"; 2015 IEEE; [retrieved on Jan. 25, 2016]; Retrieved from Internet <URL:http://dl.acm.org/citation.cfm?id=2819143 &Cfid=746332881>; pp. 705-708.*

Ohtani, et al., "On the Level of Code Suggestion for Reuse"; 2015 IEEE; [retrieved on Jan. 25, 2016]; Retrieved from Internet <URL:http://ieeexplore.ieee.org/stamp/stamp.jsp?tp= &arnumber=7069886>; pp. 26-32.*

Allamanis, Sutton "Mining Source Code Repositories at Massive scale using Language Modeling"; 2013 IEEE; [retrieved on 1-25/2016]; Retrieved from Internet <URL:http://ieeexplore.ieee.org/stamp/stamp.jsp?tp=&arnumber=6624029>; pp. 207-216.*

Hartmann, et al. "What Would Other Programmers Do? Suggesting Solutions to Error Messages", Retrieved at <<http://hci.stanford.edu/publications/2010/helpmeout/hartmann-chi10-helpmeout.pdf>>, Proceedings of the 28th international conference on Human factors in computing systems, Apr. 10-15, 2010, pp. 1019-1028, ACM New York, NY, USA.

Microsoft, Corp., Using intellisense, retrieved Mar. 16, 2011 from <<http://msdn.microsoft.com/en-us/library/hcw1s69b(v=vs.71).aspx>>, pp. 1-2.

* cited by examiner

CODE SUGGESTIONS

BACKGROUND

Modern integrated development environments (IDEs) provide a number of tools to facilitate the tasks of writing code, detecting problems in the grammar or syntax of the code, and fixing problems. However, when programmers write code, they still often turn to examples of similar code written in the past by themselves or others. Similarly, when programmers encounter an error message during the process writing code (e.g., such as compiler error messages issued by an IDE tool), they often search for instances from the past where similar bugs have been analyzed and resolved. This can involve searching through software bug databases, articles from on-line developer networks, email threads, logs of debugging sessions, crash logs, event traces or other sources, and/or talking to colleagues to find this information. It can even involve searching for solutions online by entering the error message encountered and code fragments into a search engine.

SUMMARY

The code suggestion technique embodiments described herein facilitate a programmer's ability to efficiently and accurately write code and in debugging the code as it is being written. In general, this entails automating a search for similar coding and error resolution issues from the past. Knowledge of how a similar section of code was written or how a similar coding error was handled previously can be invaluable to a programmer who is attempting to write new code for a program.

In one general implementation, a code suggestion database is created as follows. First, previously written lines of code are obtained. Code sections of one or more lines of code that correspond to a prescribed code structure, or which were created or modified within a prescribed time period, or both, are then identified within the previously-written lines of code. These identified sections of code are then designated as potential code suggestions.

In one implementation, one or more code suggestion databases are employed to provide at least one code continuation suggestion to a programmer as the programmer is writing program code. This generally involves first detecting whether the programmer has begun to write a section of code that corresponds to a prescribed code structure. When such a code section is detected, one or more code suggestion databases are searched for one or more code continuation suggestions pertinent to the detected section of code. Each of the code suggestion databases includes code continuation suggestions in the form of a section of one or more lines of code that can be used to continue the section of code the programmer has begun to write. A code continuation suggestion is pertinent to the detected section of code that the programmer has begun to write if it begins with the same, or substantially similar characters or symbols, or both, in the same or substantially similar order as the detected section of code. At least one of the discovered code continuation suggestions found to be pertinent to the detected section of code is presented to the programmer. If the programmer selects a presented code continuation suggestion, the detected section of code is completed so as to match the selected suggestion.

In one implementation, one or more of the code suggestion databases can be employed to provide at least one error correction code suggestion to a programmer as the programmer is writing program code. This generally involves first detecting whether an error message has been issued. When an error message is detected, one or more code suggestion databases are searched for one or more error correction code suggestions pertinent to the detected error message. Each of the code suggestion databases includes error correction code suggestions which take the form of a section of one or more lines of code that resulted in an issuance of an error message, the error code message issued, and a section of one or more lines of code which were created or modified after the issuance of the error message and which resulted in the removal of the error that caused the error message to be issued. An error correction code suggestion is pertinent to the detected error message if it at least comprises an error message that is the same as, or substantively similar to a prescribed degree to, the detected error message. At least one of the discovered error correction code suggestions found to be pertinent to the detected error message is then presented to the programmer.

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
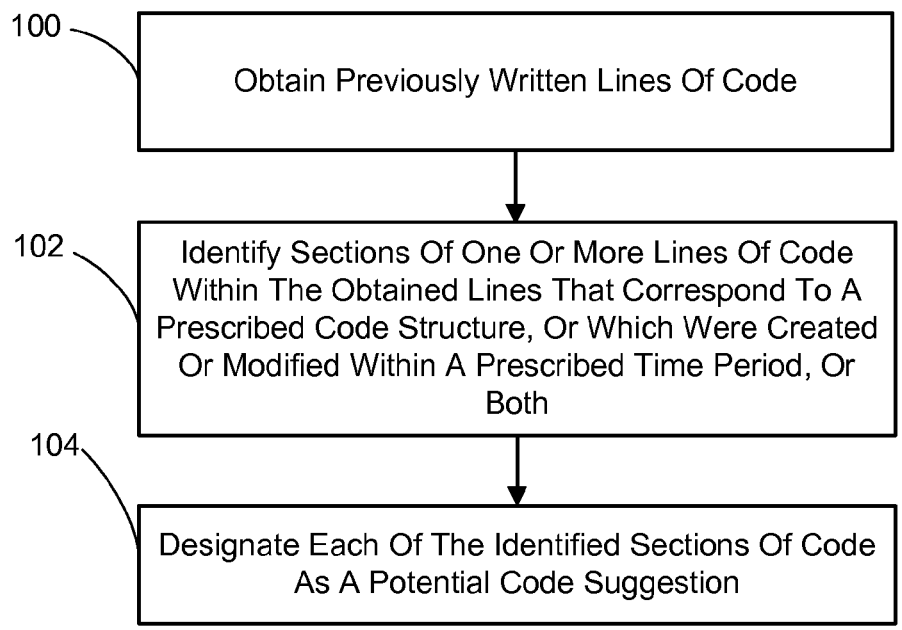
FIG. 1 is a flow diagram generally outlining one embodiment of a process for automatically generating a code suggestion database.

In the following description of code suggestion technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Code Suggestions

The code suggestion technique embodiments described herein improve the productivity of a programmer by assisting in both the writing of code and in debugging the code as it is being written. In general, this is accomplished by automating a search for similar coding and error resolution issues from the past. Knowledge of how a similar section of code was written or how a similar coding error was handled previously can be invaluable to a programmer who is attempting to write new code for a program.

More particularly, the code suggestion technique embodiments described herein are designed to extend the built-in code writing tools and error correction capabilities of existing IDEs through the use of code suggestions based on automatically and socially-created databases of programmers' work and problem solving. For example, in one embodiment, as a programmer enters code, suggested ways of finishing a line or code section are presented based on how previous programmers finished a similar line or code section. The programmer can chose one of the suggestions, which is then entered, and the programmer can proceed on with the writing of the next line or code section. In another embodiment, a programmer who encounters an error message while writing code is automatically provided with a suggested fix or fixes, based on the actions taken by previous developers when encountering a similar problem. The programmer can then adopt one of the suggestions and make similar corrections to the code he or she is writing.

In one general embodiment, to automatically generate the aforementioned socially-created databases, interactions that each of a number of programmers has with IDE, or other tools (such as with a software library, toolkit, platform, or software development kit (SDK)), being employed to write code are obtained. For example, these interactions can include the writing of a line or lines of code (e.g., writing a section of code). The interactions are then suggested to a programmer as examples of how that line or the rest of a section of code that begins with that line could be continued. Hence, a database is generated without any effort on the part of the programmers whose work is captured to provide examples. In addition, error correction transitions can be identified in the obtained code. In general, an error correction transition includes a before state of an applicable portion of the code captured from a programmer, an error (or warning) message issued by an IDE tool (or other tool) being employed as a result of entering the before state, and an after state of an applicable portion of the code representing the corrective action the programmer took to resolve the error. When a programmer writing code encounters an error message, error correction transitions associated with that type of error message are presented for the programmer to use as an example of how previous programmers fixed the error.

The foregoing automated and integrated technique has considerable benefits in that large volumes of coding examples and error-solution information is captured and persisted in a database. It is believed that in a typical hour of coding, a programmer would generate between 10 and 100 interactions. As this occurs implicitly during normal development activities, and does not require programmer to explicitly generate the examples, code suggestion databases are created without any extra effort on the part of the programmer beyond using a development environment as usual.

The following sections described the creation of a code suggestion database and its use for suggesting code and error solutions in more detail.

1.1 Creating a Code Suggestion Database

As indicated previously, a code suggestion database is automatically generated for use in suggesting one or more lines of program code to a programmer as the programmer is writing the code. In one implementation illustrated in FIG. 1, this involves using a computer (such as one of the computing devices described in the forthcoming Exemplary Operating Environments section) to, obtain previously written lines of code (100). In one implementation, this entails, for each of a group of one or more programmers, recording each line of code written by the programmer during a programming session. In another implementation, this entails accessing a repository of code previously written by a group of one or more programmers. For example, in this latter implementation, a database can be generated offline using a repository of previously-written code (such as a source code version control system database, or a directory on a hard disk/network share with code files). This is advantageous as it is possible to "bootstrap" the database immediately once installed. Code sections of one or more lines of code within the obtained lines that correspond to a prescribed code structure, or which were created or modified within a prescribed time period, or both, are then identified (102). Each of the identified sections of code are then designating as a potential code suggestion (104).

The aforementioned prescribed code structures can include loops, sub-loops, structures in loops, pauses, white spaces, blank lines, among other structures. These structures could also include meta information, such as the platform it was written for, the programmers identity and/or skill level, what license the code is under, ownership of the code. In addition, these structures can take the form of the aforementioned error correction transitions. More particularly, a section of one or more lines of code that resulted in an issuance of an error message indicating a problem with the code section; the error message itself; and a section of one or more lines of code that were created or modified after the issuance of the error message and which resulted in the removal of the error that caused the error message to be issued form an error correction transition.

It should be noted that the particular line or lines of code that cause an error message to be issued, might not be in themselves be erroneous, but instead incompatible with a previous portion of the code being written. Thus, the section of code that represents the changes that were made to resolve the error, may not be changes to the code that triggered the error message, but to previously written code. To this end one way of identifying the section of code that was created or modified after the issuance of the error message and which resulted in the removal of the error that caused an error message to be issued, is to identify all the changes that were made to the code between issuance of the error massage and when the error message goes away. This is an example of the aforementioned prescribed time period that can be used to identify a section of code within the obtained lines of code (see action 102 of FIG. 2).

With regard to identifying a section of code that resulted in an issuance of an error message, different IDE (or other tools) will handle this differently. For example, a tool might identify the code, or a portion thereof, which was written between the last compilation of the code and a current compilation, as erroneous. In auto compiling IDE or other tools the code being written is periodically compiled without an instruction to do so by the programmer. Typically, this occurs often enough that the potentially erroneous code is identified within the last line, or a portion thereof, written by the programmer. In manually compiling schemes, it is possible that the programmer will not compile the code until multiple lines of code have been written. In such cases, it is possible that more than one portion of the code written since the last compilation will be flagged as erroneous and multiple error messages could be issued. If the programmer attempts to resolve more than one of the errors prior to re-compiling, it would be difficult to identify which changes resulted in which error messages being removed. As such all the code associated with the changes would be identified as the section of code that was created or modified after the issuance of the error message and which resulted in the removal of the error that caused an error message to be issued. However, it is believed this situation will be rare as most programmers tend to resolve one error at a time before re-compiling. Alternately, in another implementation, identifying a section of code that resulted in an issuance of an error message could be limited to just those sections where only one error was corrected or just one part was changed.

It is noted that in some instances, a programmer will simply delete all the code that was written between compilations that resulted in an error message, rather than attempting to change it to resolve the problem. As such an action would not be useful to a future programmer who encounters a similar error in determining how to fix the code; this wholesale deletion of code is not identified as an error correction transition.

It is further noted that a code suggestion database can be maintained locally or shared subject to some sharing and access restrictions (such as license use and code ownership). These sharing restrictions will be described in more detail in the next section.

1.2 Providing Code Continuation Suggestions

As described previously, potential code suggestions in a code suggestion database that represent interactions are suggested to a programmer who starts a line of code as examples of how that line or the rest of a section of code that begins with that line could be continued. As such, these code continuation suggestions each include one or more lines of program code. In one implementation illustrated in FIG. 2, providing code continuation suggestions to a programmer involves using a computer (such as one of the computing devices described in the forthcoming Exemplary Operating Environments section) to first detect whether the programmer has begun to write a section of code that corresponds to a prescribed code structure (200). When it is detected that the programmer has begun to write a section of code, one or more code suggestion databases are searched for one or more code continuation suggestions pertinent to the detected section of code (202). In one version, a code continuation suggestion is pertinent to the detected section of code that the programmer has begun to write if it begins with the same or substantially similar characters or symbols (or both) in the same or substantially similar order as the detected section of code. At least one of the code continuation suggestions found in the search is then presented (e.g., displayed) to the programmer (204). If more than one code continuation suggestion is found in the aforementioned search, in one implementation they are ranked (as will be described in more detail in a later section) and presented to the programmer in ranked order. If the number of ranked code continuation suggestions exceeds a prescribed number, then in one implementation just the top ranking suggestions up to the prescribed number are presented to the programmer. It is then determined if the programmer selects one of the presented code continuation suggestions (206). If so, then the detected section of code is automatically completed so as to match the selected code continuation suggestion (208). In either case, the foregoing process is repeated for the duration of the coding session.

Figure 2:
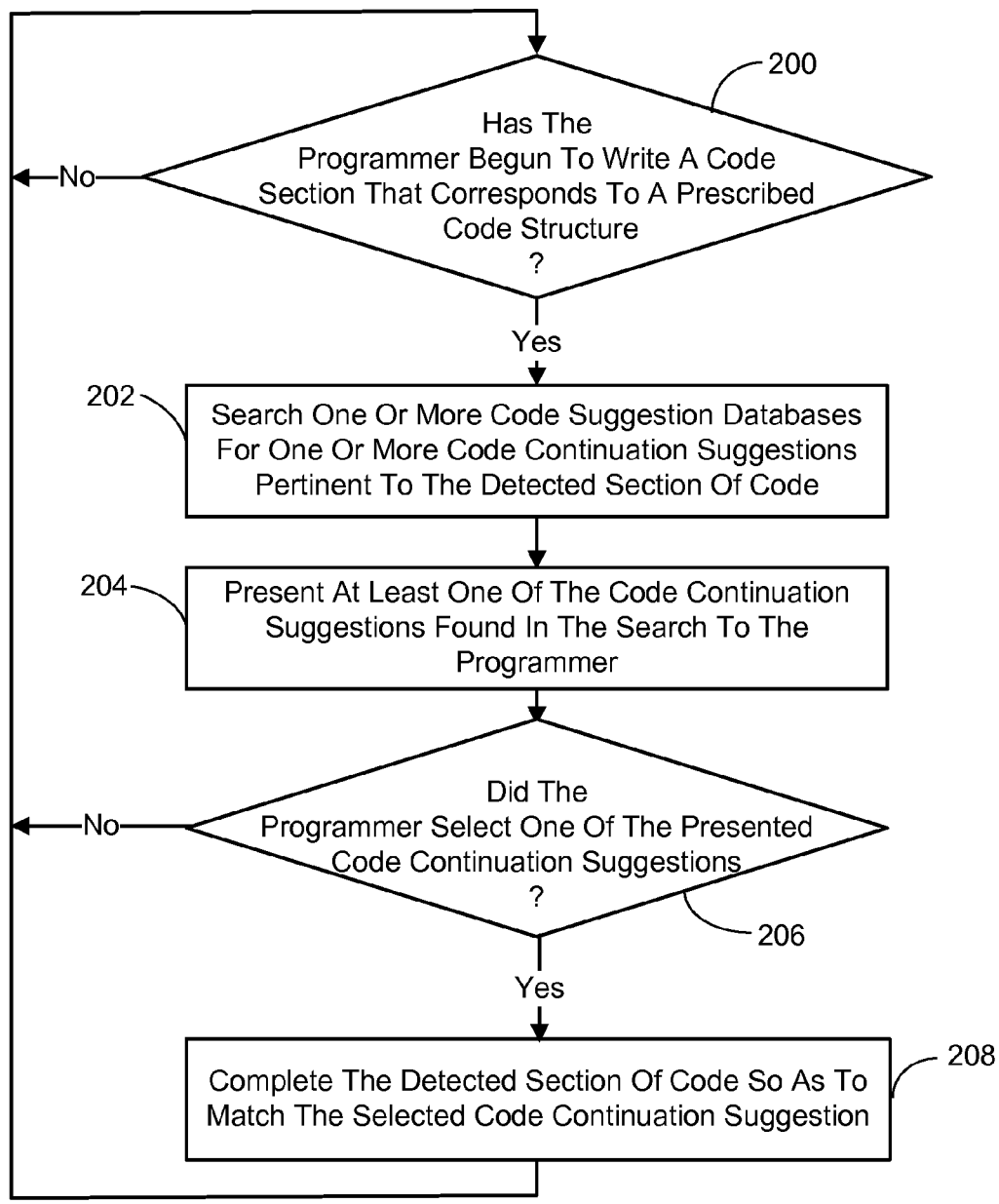
FIG. 2 is a flow diagram generally outlining one embodiment of a process for providing code continuation suggestions to a programmer.

It one implementation, when a programmer continues to write the detected section of code without selecting a presented code continuation suggestion, the searching and presenting actions of the process of FIG. 2 are repeated with each new character or symbol added to the detected section of code.

In one implementation, a code continuation suggestion is also pertinent to the detected section of code that the programmer has begun to write if it is associated in the database with one or more attributes which match attributes associated with the detected section of code. These attributes can include, but are not limited to, at least one of the following: a code category which indicates which of a group of prescribed types of code the code associated with the code continuation suggestion and detected code section belongs to; or the identity of a software program used to generate the code associated with the code continuation suggestion and detected code section; or a version identifier of the software code library used in generating the code associated with the code continuation suggestion and detected code section; or information related to a program or project associated with the code continuation suggestion and detected code section.

With regard to the one or more code suggestion databases that are searched for code continuation suggestions, in one implementation this involves searching only the database or databases specified by the programmer. This has the advantage of tailoring the search to code suggestion databases the programmer believes could provide the best suggestions. For example, the programmer might specify only databases where his or her previous work is recorded, or to databases where the programmer knows the work of a trusted or highly acclaimed programmer is recorded. Other examples include restricting the search to databases where the work of a particular project group or where code associated with a particular program is recorded.

The one or more code suggestion databases employed in the search could also be limited to just those that the programmer is authorized to access. For example, a company, university, project group or other proprietary group that constructed (or otherwise owns) a code suggestion database could restrict access to just its members or other invited programmers. Further, a database could be made available in conjunction with an IDE tool (or other tool) and access to it could be subject to the same or a different license than the tool.

With regard to the implementation where a code continuation suggestion is pertinent to the detected section of code that the programmer has begun to write if it begins with the same or substantially similar characters or symbols (or both) in the same or substantially similar order as the detected section of code, determining if the code continuation suggestion has substantially similar characters and symbols, and a substantially similar order can involve the following. Conventional syntactic and semantic analysis methods can be applied to identify the operative portions of the suggestion, as well as the non-essential portions of the suggestion. The same is then be performed on the detected section of code. Determining if a code continuation suggestion is substantially similar to the detected section of code would then involve considering only the operative portions of each. For example, variable names and indenting could be considered non-essential and so would be ignored in the determination process. In addition, when a selected code continuation suggestion is used to continue a detected section of code so as to match the suggestion, in one implementation this would involve replacing any variable names previously found in the suggestion with the corresponding previously identified variable names found in the detected section of code.

1.3 Providing Error Correction Code Suggestions

Figure 3:
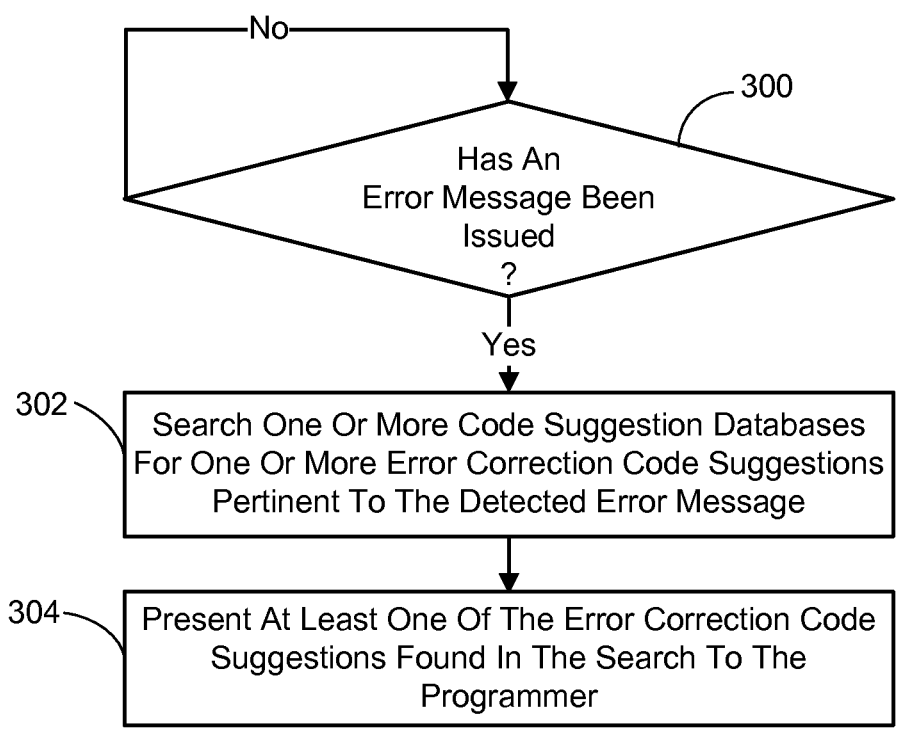
FIG. 3 is a flow diagram generally outlining one embodiment of a process for providing error correction code suggestions to a programmer.

As described previously, potential code suggestions in a code suggestion database that represent error correction code suggestions are suggested to a programmer who encounters an error message during a coding session. In one implementation illustrated in FIG. 3, providing error correction code suggestions to a programmer involves using a computer (such as one of the computing devices described in the forthcoming Exemplary Operating Environments section) to first detect whether an error message has been issued as the programmer is writing program code (300). When an error message is detected, one or more code suggestion databases is searched for one or more error correction code suggestions pertinent to the detected error message (302). As described previously, a error correction code suggestion includes a section of one or more lines of code that resulted in an issuance of an error message, the error code message issued, and a section of one or more lines of code which were created or modified after the issuance of the error message and which resulted in the removal of the error that caused the error message to be issued. An error correction code suggestion is pertinent to the detected error message if it at least includes an error message that is the same as or substantively similar to a prescribed degree to the detected error message. At least one of the error correction code suggestions found in the search is then presented (e.g., displayed) to the programmer (304). In one implementation, each error correction code suggestion is displayed with the code section that resulted in an issuance of an error message on the left side of a suggestion window, and the code section that resulted in the removal of the error on the right side of the suggestion window.

If more than one error correction code suggestions is found in the aforementioned search, in one implementation they are ranked (as will be described in more detail in the next section) and presented to the programmer in ranked order. If the number of ranked error correction code suggestions exceeds a prescribed number, then in one implementation just the top ranking suggestions up to the prescribed number are presented to the programmer. The programmer can then adopt the corrections shown in any of the of the presented error correction code suggestions to fix the code he or she is writing.

In one implementation, an error correction code suggestion is pertinent to the detected error message if it is associated in the database with one or more attributes which match attributes associated with the program code the programmer was writing when the error message was issued. Similar to the code continuation suggestions described previously, the attributes can include, but are not limited to, at least one of the following: a code category which indicates which of a group of prescribed types of code the code associated with the error correction code suggestion and code triggering the error message belongs to; or the identity of a software program used to generate the code associated with the error correction code suggestion and code triggering the error message; or a version identifier of the software code library used in generating the code associated with the error correction code suggestion and code triggering the error message; or information related to a program or project associated with the error correction code suggestion and code triggering the error message.

With regard to the one or more code suggestion databases that are searched for error correction code suggestions, in one implementation this involves searching only the database or databases specified by the programmer. This has the advantage of tailoring the search to code suggestion databases the programmer believes could provide the best error correction suggestions. For example, the programmer might specify only databases where his or her previous work is recorded, or to databases where the programmer knows the work of a trusted or highly acclaimed programmer is recorded. Other examples include restricting the search to databases where the work of a particular project group or where code associated with a particular program is recorded.

The one or more code suggestion databases employed in the search could also be limited to just those that the programmer is authorized to access. For example, a company, university, project group or other proprietary group that constructed (or otherwise owns) a code suggestion database could restrict access to just its members or other invited programmers. Further, a database could be made available in conjunction with an IDE tool (or other tool) and access to it could be subject to the same or a different license than the tool.

1.4 Ranking Code Suggestions

Figure 4:
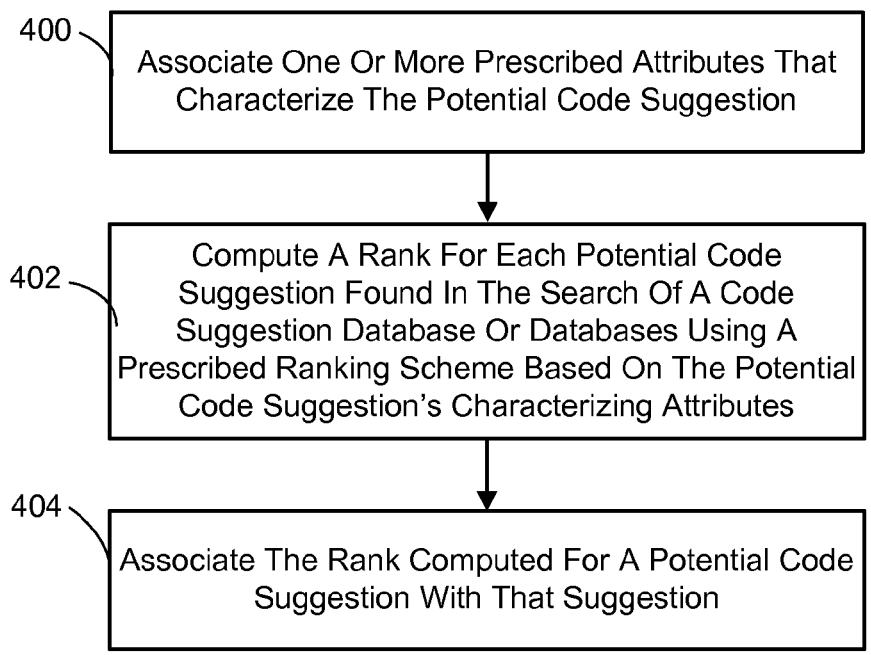
FIG. 4 is a flow diagram generally outlining one embodiment of a process for ranking code suggestions provided to a programmer.

In one implementation of the code suggestion technique embodiments described herein, the code suggestions provided to a programmer are ranked as indicated previously. Referring to FIG. 4, for each potential code suggestion this generally involves, associating one or more prescribed attributes that characterize a potential code suggestion in a code suggestion database (400). When a code suggestion database or databases are searched in order to present either a code continuation suggestion or error correction code suggestion to a programmer the search results are ranked. More particularly, based on the characterizing attributes, a rank is computed for each potential code suggestion found in the search using a prescribed ranking scheme (402). The computed rank is then associated with the potential code suggestion (404).

In one implementation, the foregoing prescribed attributes include at least one of the following: a code category which indicates which of a group of prescribed types of code the potential code suggestion belongs to; or the identity of a software program used to generate the code of the potential code suggestion; or a version identifier of the software code library used in generating the code; or the identity of the person who generated the code; or information related to a software program or project associated with the potential code suggestion; or a date or time (or both) that the code of the potential code suggestion was generated. Further, in one implementation, when a code suggestion is suggested to a programmer during a code writing session, it is recorded whether that programmer employed the suggested code. If a programmer employs a code suggestion, a use indication indicative of this fact is associated with that potential code suggestion in the database as one of its prescribed attributes. In yet another implementation, potential code suggestions that are the same as, or substantively similar to a prescribed degree, in the database are identified and associated with a group. A frequency indicator is then established for each group that is indicative of how many potential code suggestions have been identified as being the same or substantively similar within the group. This frequency indicator is then associated with each of the potential code suggestions in a group under consideration as one of its prescribed attributes.

The ranking procedure used to rank the potential code suggestions found in a search can be any appropriate scheme. Generally, these procedures involve assigning a measure of importance to each attribute considered in the ranking process. This measure characterizes the likelihood that a code continuation suggestion or an error correction code suggestion will satisfactorily continue the section of code the programmer is entering or resolve a coding error associated with a detected error message, respectively, based on a matching attribute. One way of determining the relative importance of the attributes is through machine learning techniques that identify the attributes that are most common in code continuation suggestions and error correction code suggestions that were adopted by a programmer writing code. The ranking procedure then assigns a score indicative of the relative importance of a potential code suggestion in view of the other potent code suggestions. This allows the potential code suggestions, or a prescribed number of the top ranking suggestions, to be presented in descending order of their score to a programmer. The ranking score associated with each code suggestion can also be presented.

2.0 Exemplary Operating Environments

Figure 5:
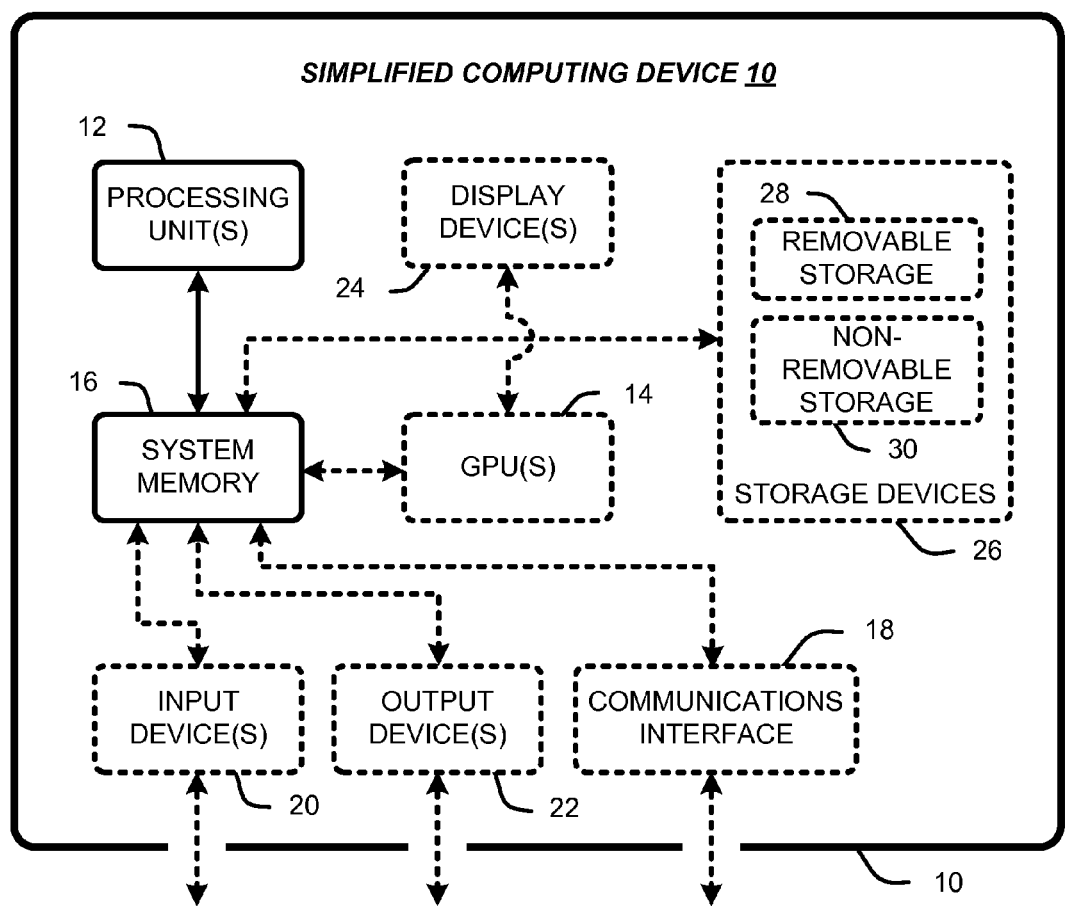
FIG. 5 is a diagram depicting a general purpose computing device constituting an exemplary system for implementing code suggestion technique embodiments described herein.

The code suggestion technique embodiments described herein is operational within numerous types of general purpose or special purpose computing system environments or configurations. FIG. 5 illustrates a simplified example of a general-purpose computer system on which various embodiments and elements of the code suggestion technique embodiments, as described herein, may be implemented. It should be noted that any boxes that are represented by broken or dashed lines in FIG. 5 represent alternate embodiments of the simplified computing device, and that any or all of these alternate embodiments, as described below, may be used in combination with other alternate embodiments that are described throughout this document.

For example, FIG. 5 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the code suggestion technique embodiments described herein, the device should have a sufficient computational capability and system memory to enable basic computational operations. In particular, as illustrated by FIG. 5, the computational capability is generally illustrated by one or more processing unit(s) 12, and may also include one or more GPUs 14, either or both in communication with system memory 16. Note that that the processing unit(s) 12 of the general computing device may be specialized microprocessors, such as a DSP, a VLIW, or other microcontroller, or can be conventional CPUs having one or more processing cores, including specialized GPU-based cores in a multi-core CPU.

In addition, the simplified computing device of FIG. 5 may also include other components, such as, for example, a communications interface 18. The simplified computing device of FIG. 5 may also include one or more conventional computer input devices 20 (e.g., pointing devices, keyboards, audio input devices, video input devices, haptic input devices, devices for receiving wired or wireless data transmissions, etc.). The simplified computing device of FIG. 5 may also include other optional components, such as, for example, one or more conventional display device(s) 24 and other computer output devices 22 (e.g., audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 5 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the code suggestion technique embodiments described herein, or portions thereof, may be stored, received, transmitted, or read from any desired combination of computer or machine readable media or storage devices and communication media in the form of computer executable instructions or other data structures.

Finally, the code suggestion technique embodiments described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

3.0 Other Embodiments

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for creating a database of code suggestions for use in suggesting one or more lines of program code to a programmer as the programmer is writing program code, comprising:
   using a computer to perform the following process actions:
   obtaining previously written lines of code;
   identifying sections of one or more lines of code within the previously written lines of code that correspond to a prescribed code structure, or which were created or modified within a prescribed time period, or both; and then
   designating each of the identified sections of code as a potential code suggestion; and then
   creating a database of code suggestions comprising a plurality of the identified sections of code which were designated as potential code suggestions.

2. The process of claim 1, further comprising a process action of, for each designated potential code suggestion, associating one or more prescribed attributes which characterize the potential code suggestion.

3. The process of claim 2, wherein the process action of associating one or more prescribed attributes, comprises an action of associating at least one of a code category which indicates which of a group of prescribed types of code the potential code suggestion belongs to, or an identity of a software program used to generate the code of the potential code suggestion, or a version identifier of a software code library used in generating the code of the potential code suggestion, or an identity of the person who generated the code of the potential code suggestion, or information related to a software program or project associated with the potential code suggestion, or a date or time or both that the code of the potential code suggestion was generated.

4. The process of claim 2, wherein whenever a code suggestion is suggested to a programmer it is recorded whether that programmer employed the suggested code, and wherein the process action of associating one or more prescribed attributes, comprises an action of associating a use indication whenever the potential code suggestion was employed by a programmer to which it was suggested.

5. The process of claim 2, further comprising a process action of identifying potential code suggestions that are the same or substantively similar to a prescribed degree, and wherein the process action of associating one or more prescribed attributes, comprises an action of associating a frequency indication indicative of how many potential code suggestions have been identified as being the same as, or substantively similar to a prescribed degree to, a potential code suggestion under consideration.

6. The process of claim 1, wherein the process action of obtaining previously written lines of code, comprises an action of, for each of a group of one or more programmers, recording each line of code written by the programmer during a programming session.

7. The process of claim 1, wherein the process action of obtaining previously written lines of code, comprises an action of, accessing a repository of code previously written by a group of one or more programmers.

8. The process of claim 1, wherein the process action of identifying sections of one or more lines of code within the previously written lines of code that correspond to a prescribed code structure, or which were created or modified within a prescribed time period, or both, comprises the actions of:
   identifying a section of one or more lines of code that resulted in an issuance of an error message indicating a problem with the code section; and
   identifying a section of one or more lines of code which were created or modified after the issuance of the error message and which resulted in the removal of the error that caused the error message to be issued.

9. The process of claim 8, wherein the process action of designating the identified sections of code as a potential code suggestions, comprises an action of designating the identified section of one or more lines of code that resulted in an issuance of an error message, the error code message issued, and the identified section of one or more lines of code which were created or modified after the issuance of the error message and which resulted in the removal of the error that caused the error message, to be issued as a potential code suggestion.

10. A computer-implemented process for providing an error correction code suggestion comprising one or more lines of program code to a programmer as the programmer is writing program code, comprising:
    using a computer to perform the following process actions:
    detecting whether an error message has been issued as the programmer is writing program code; and
    whenever an error message is detected,
        searching one or more code suggestion databases for one or more error correction code suggestions pertinent to the detected error message, each of said code suggestion databases comprising error correction code suggestions each of which comprises a section of one or more lines of code that resulted in an issuance of an error message, the error code message issued, and a section of one or more lines of code which were created or modified after the issuance of the error message and which resulted in the removal of the error that caused the error message to be issued, and wherein an error correction code suggestion is pertinent to the detected error message if it at least comprises an error message that is the same as, or substantively similar to a prescribed degree to, the detected error message, and
        presenting at least one error correction code suggestion found to be pertinent to the detected error message that were found in the search of said one or more code suggestion databases to the programmer.

11. The process of claim 10, wherein said error correction code suggestions each further comprise a ranking which was established based on one or more attributes associated with the error correction code suggestion which characterize the likelihood that the error correction code suggestion will resolve a coding error associated with a detected error message, and wherein the process action of presenting at least one error correction code suggestion found to be pertinent to the detected error message, comprises presenting along with each error correction code suggestion, the ranking associated with that suggestion.

12. The process of claim 10, wherein the process action of searching one or more code suggestion databases for one or more error correction code suggestions pertinent to the detected error message, comprises a process action of searching at least one of only the database or databases specified by the programmer, or only the database or databases that the programmer is authorized to access.

13. The process of claim 10, wherein an error correction code suggestion is pertinent to the detected error message if it comprises one or more attributes which match attributes associated with the program code the programmer was writing when the error message was issued.

14. The process of claim 13, wherein the one or more attributes which match attributes associated with the program code the programmer was writing when the error message was issued comprises at least one of a code category which indicates which of a group of prescribed types of code the error correction code suggestion belongs to, or an identity of a software program used to generate the code of the error correction code suggestion, or a version identifier of a software code library used in generating the code of the error correction code suggestion, or information related to a software program or project associated with the error correction code suggestion.

\* \* \* \* \*